(12) United States Patent
Que

(10) Patent No.: US 9,482,812 B2
(45) Date of Patent: Nov. 1, 2016

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventor: Chengwen Que, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 103 days.

(21) Appl. No.: 14/420,370

(22) PCT Filed: Oct. 8, 2014

(86) PCT No.: PCT/CN2014/088147
§ 371 (c)(1),
(2) Date: Feb. 8, 2015

(87) PCT Pub. No.: WO2016/045145
PCT Pub. Date: Mar. 31, 2016

(65) Prior Publication Data
US 2016/0091656 A1 Mar. 31, 2016

(51) Int. Cl.
*G02F 1/1333* (2006.01)
*F21V 8/00* (2006.01)

(52) U.S. Cl.
CPC .................. *G02B 6/0088* (2013.01)

(58) Field of Classification Search
CPC ............................ G02F 1/1333; G02B 6/0088
See application file for complete search history.

(56) References Cited

U.S. PATENT DOCUMENTS

| | | | | |
|---|---|---|---|---|
| 7,097,338 B2* | 8/2006 | Li | ........................ | G02B 6/0086 349/58 |
| 8,045,128 B2* | 10/2011 | Kim | .................. | G02F 1/133608 349/158 |
| 8,164,703 B2* | 4/2012 | Cheng | .................. | G02B 6/0088 349/58 |
| 8,807,820 B2* | 8/2014 | Noh | .................. | G02F 1/133308 362/294 |
| 9,151,975 B2* | 10/2015 | Yu | ...................... | G02F 1/133308 |
| 2006/0290836 A1* | 12/2006 | Chang | .................. | G02B 6/0088 349/58 |
| 2014/0043848 A1* | 2/2014 | Jung | ..................... | G02B 6/0055 362/606 |
| 2014/0063401 A1* | 3/2014 | Kuo | .................. | G02F 1/133308 349/58 |
| 2015/0177554 A1* | 6/2015 | Li | ...................... | G02F 1/133308 349/58 |
| 2015/0212361 A1* | 7/2015 | Zhao | .................. | G02F 1/133308 349/58 |

FOREIGN PATENT DOCUMENTS

| CN | 101943375 A | 1/2011 |
|---|---|---|
| CN | 202149990 U | 2/2012 |
| CN | 103591556 A | 2/2014 |

* cited by examiner

Primary Examiner — Timothy L Rude
(74) Attorney, Agent, or Firm — Andrew C. Cheng

(57) ABSTRACT

A backlight module includes a backplane and a middle frame. The backplane includes a bottom surface and a side wall. Multiple engagement slots are disposed at the side wall, and each has an engagement part. The middle frame includes a horizontal support portion having a first end connected with multiple hooks. Each of the hooks corresponds to one engagement slot. Each hook includes two connection arms. One end of the two connection arms connects with the first end of the horizontal support portion. The other end of the two connection arms is disposed with a connection member. The two connection arms are connected through an elastic member. The hooks are mounted in the engagement slots. The connection members and the engagement parts are engaged with each other such that the middle frame is secured in the backplane. The present invention also discloses a liquid crystal display device.

20 Claims, 3 Drawing Sheets

BACKLIGHT MODULE AND LIQUID CRYSTAL DISPLAY DEVICE

BACKGROUND OF THE INVENTION

1. Field of the Invention

The present invention relates to a liquid crystal display device, and more particularly to a backlight module and a liquid crystal display device including the backlight module.

2. Description of Related Art

A liquid crystal display device (LCD) has advantages such as thin, low power consumption, and no radiation. As a result, the LCD has been widely used, for example, mobile phones, digital cameras, computers, TV screens and so on. Most of the LCD in the current market is a backlight type liquid crystal display device, which includes a liquid crystal panel and a backlight module. The liquid crystal panel and the backlight module are disposed oppositely. The backlight module provides a light source to the liquid crystal panel so that the liquid crystal panel can display an image. In the increasingly competitive display market, design with difference is an important research direction to enhance product selling. In the current product, the thin type and the narrow frame design can obtain a more beautiful appearance so as to attract the attention of the consumers.

FIG. 1 is a schematic diagram of a backlight module according to the prior art. The backlight module includes a backplane 1, a sequential disposition of a reflection plate 1, a light guide plate 3, and an optical film group 4, and a middle frame 5 cooperated and secured with the backplane 1. A vertical support structure of the middle frame 5 includes an inner wall 6 and an outer wall 7. A concave slot is formed between the inner wall 6 and the outer wall 7. The outer wall 7 is provided with an engagement slot 8. A side wall of the backplane 1 is provided with a hook 9. Through inserting the side wall of the backplane 1 into the engagement slot 8, the hook 9 and the engagement slot 8 are engaged with each other such that the backplane 1 and the middle frame 5 are secured. In the above backlight module, the vertical support structure of the middle frame 5 includes the inner wall 6 and the outer wall 7. The inner wall 6 and the outer wall 7 enclose the side wall of the backplane 1. The existence of the outer wall 7 increases the width of the frame of the liquid crystal display module, which is not beneficial for a narrow frame design.

SUMMARY OF THE INVENTION

In order to improve the drawback of the prior art, the present invention provides a backlight module. Through improving the structure for securing the backplane and the middle frame, the width of the frame is effectively reduced, which is beneficial for a narrow frame design of the liquid crystal display device.

In order to achieve the above purpose, a technical solution provided by the present invention is: a backlight module comprising: a backplane including a bottom surface and a side wall, wherein, multiple engagement slots are disposed at the side wall, and each of the engagement slots has an engagement part; and a middle frame including a horizontal support portion having a first end; the first end is connected with multiple hooks; each of the hooks corresponds to one engagement slot; each of the hooks includes two connection arms; one end of each of the two connection arms connects with the first end of the horizontal support portion; the other end of each of the two connection arms is disposed with a connection member; the two connection arms are connected through an elastic member; wherein, the hooks are mounted in the engagement slots; the connection members and the engagement parts are engaged with each other such that the middle frame is secured in the backplane.

Wherein, each of the engagement slots includes a receiving slot and a guiding slot; the guiding slot is located at an upper portion of the side wall of the backplane; the receiving slot is located at a lower portion of the side wall of the backplane; the engagement part is located between the receiving slot and the guiding slot; the receiving slot and the guiding slot are communicated with each other.

Wherein, at the bottom surface of the backplane, and corresponding to each of the receiving slots, a notch is respectively provided, and the notch is communicated with the receiving slot.

Wherein, the guiding slot is an inverse-trapezoid structure; a width at a communication portion of the guiding slot and the receiving slot is smaller than a width of an upper portion of the guiding slot; the width at the communication portion of the guiding slot and the receiving slot is also smaller than a width of the receiving slot.

Wherein, at the bottom surface of the backplane, and corresponding to each of the receiving slots, a notch is respectively provided, and the notch is communicated with the receiving slot.

Wherein, the middle frame also includes a vertical support portion; one terminal of the vertical support portion is connected with the horizontal support portion, and the other terminal of the vertical support portion abuts against the bottom surface of the backplane.

Wherein, the first end of the horizontal support portion extends to and aligns with an outer side surface of the side wall of the backplane; each of the hooks connects to a bottom of the first end of the horizontal support portion.

Wherein, an outer side surface of the hook is aligned with or retracted inside the outer side surface of the side wall.

Wherein, the backlight module further includes a reflection plate, a light guide plate, and an optical film group; a second end of the horizontal portion secures and compresses the optical film group.

Wherein, the middle frame is formed integrally by a plastic material.

The present invention also provides a liquid crystal display device including a liquid crystal panel and a backlight module; the liquid crystal panel and the backlight module are disposed oppositely; the backlight module provides a light source to the liquid crystal panel so that the liquid crystal panel can display an image, wherein, the backlight module is the backlight module described above.

Beneficial Effect:

In the backlight module provided by the above embodiments, through disposing the engagement slot on the side wall of the backplane, and the hook which is cooperated to the engagement slot is connected at the vertical support portion of the middle frame. Because the hook is mounted in the engagement slot and engaged with each other, the middle frame and the backplane are secured. In the above embodiments, the vertical support portion of the middle frame only requires one support wall, and does not require covering the side wall of the backplane at outer side. The width of the frame of the liquid crystal display module could be effectively reduced, which is beneficial for a narrow frame design of the liquid crystal display module.

DETAILED DESCRIPTION OF THE PREFERRED EMBODIMENT

The following content combines with the drawings and the embodiment for describing the present invention in detail.

Figure 1:
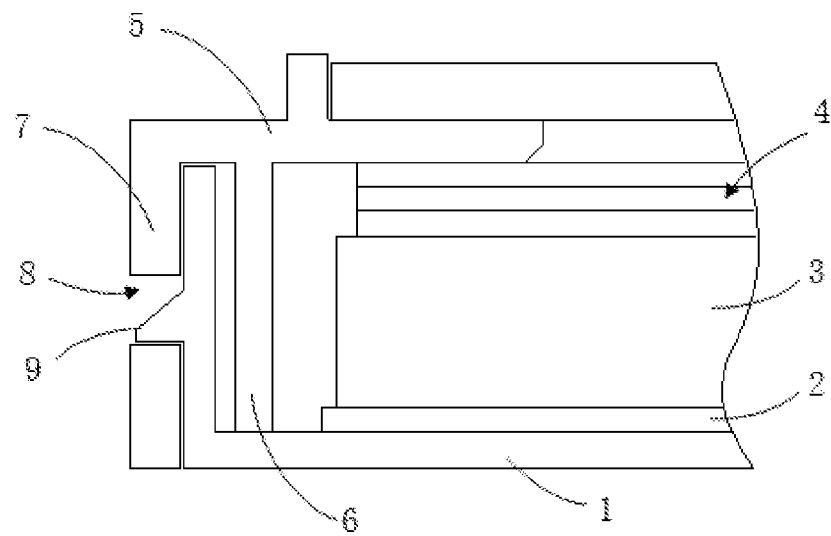
FIG. 1 is a schematic diagram of a backlight module according to the prior art.
Figure 2:
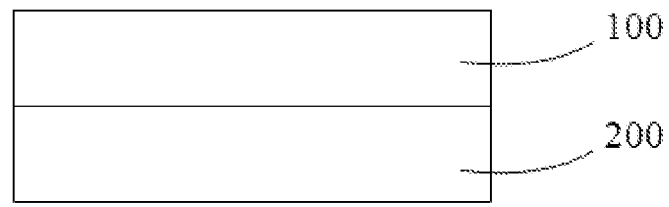
FIG. 2 is a schematic diagram of a liquid crystal display device according to an embodiment of the present invention.

FIG. 2 is a schematic diagram of a liquid crystal display device according to an embodiment of the present invention. As shown in FIG. 2, the liquid crystal display device includes a liquid crystal panel 100 and a backlight module 200. The liquid crystal panel 100 and the backlight module 200 are disposed oppositely. The backlight module 200 provides a light source to the backlight module 200 such that the liquid crystal display panel 100 can display an image.

Figure 3:
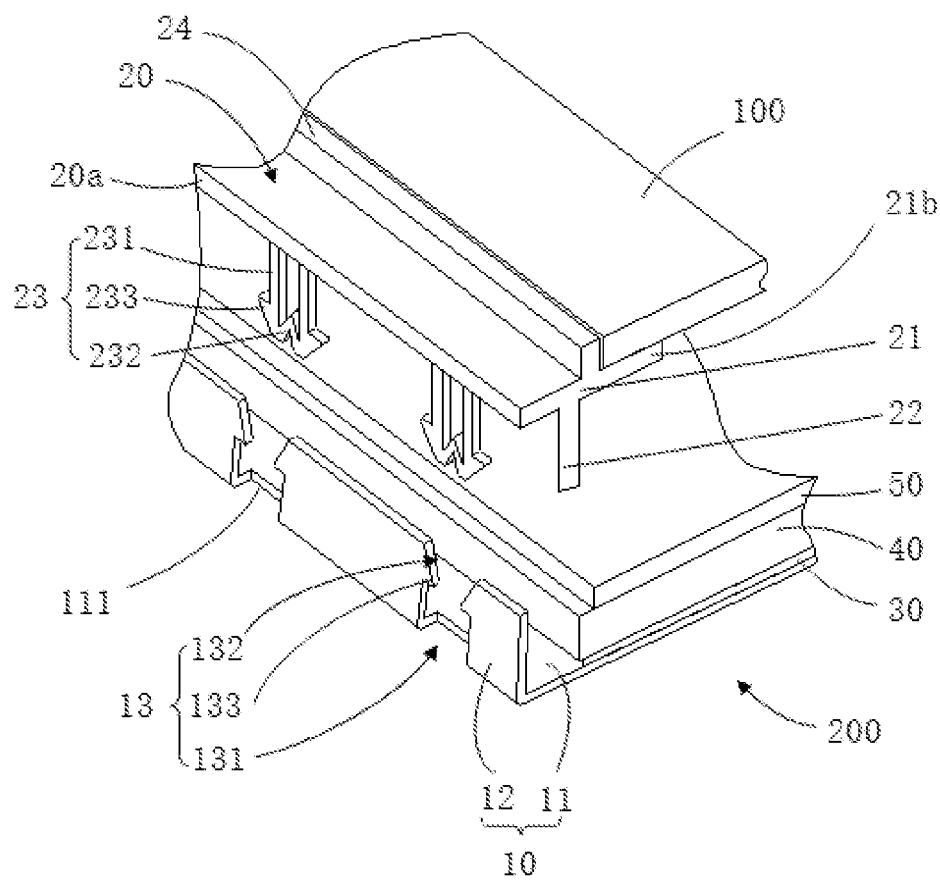
FIG. 3 is a perspective view of the backlight module before assembled with the middle frame according to an embodiment of the present invention.
Figure 4:
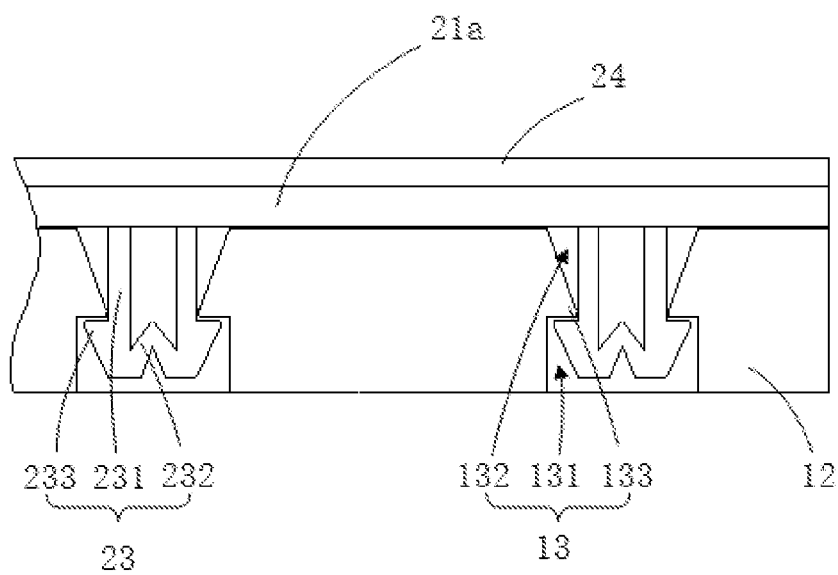
FIG. 4 is a side view of the backlight module after assembled with the middle frame shown in FIG. 3.
Figure 5:
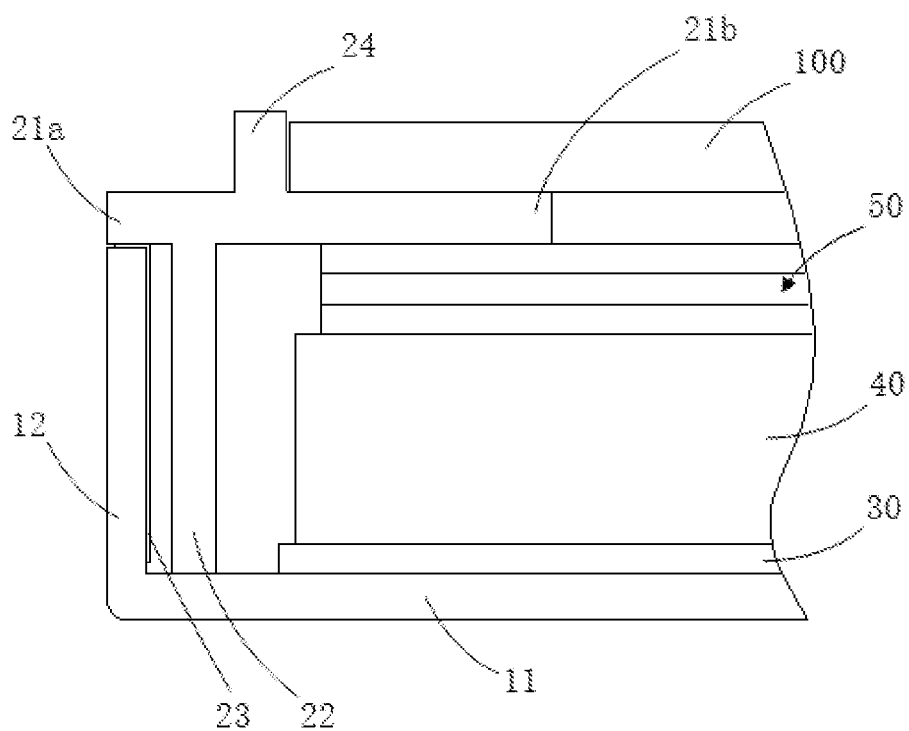
FIG. 5 is a front view of the backlight module after assembled with the middle frame shown in FIG. 3.

Wherein, with reference to FIG. 3 to FIG. 5, the backlight module 200 includes a backplane 10 and a middle frame 20. The backplane 10 includes a bottom surface 11 and a side wall 12. Multiple engagement slots 13 (In FIG. 3, two slots are exemplary shown. However, the number of the slots can be appropriately selected according to the area of the liquid crystal display device) are disposed on the side wall 12. Furthermore, each of the engagement slots 13 includes a receiving slot 131, a guiding slot 132, and an engagement part 133 disposed between the receiving slot 131 and the guiding slot 132. Specifically, as shown in FIG. 4, the guiding slot 132 is located at an upper portion of the side wall 12, and the receiving slot 131 is located at a lower portion of the side wall 12. The guiding slot 132 and the receiving slot 131 are communicated with each other. In this embodiment, the guiding slot 132 is an inverse-trapezoid structure. A width at a communication portion of the guiding slot 132 and the receiving slot 131 is smaller than a width of an upper portion of the guiding slot 132. The width at the communication portion of the guiding slot 132 and the receiving slot 131 is also smaller than a width of the receiving slot 131.

The middle frame 20 is located on the backplane 10. The middle frame 20 comprises a horizontal support portion 21 and a vertical support portion 22. A first end 21a of the horizontal support portion 21 is connected with multiple hooks 23. Each of the multiple hooks 23 corresponds to one engagement slot 13. Specifically, each of the hooks 23 includes two connection arms 231. Each of the connection arms has two terminals. One terminal of each of the connection arms 231 is connected with the first end 21a of the horizontal support portion 21. The other terminal of each of the two connection arms 231 is disposed with a connection member 233. The two connection arms 231 are connected through an elastic member 232. The vertical support portion 22 has two terminals. One terminal of the vertical support portion 22 is connected with the horizontal support portion 21, and the other terminal of the vertical support portion 22 abuts against a bottom surface 11 of the backplane 10.

When the middle frame 20 and the backplane 10 are assembled with each other, the hook 23 mounts in the engagement slot 13. The connection member 233 and the engagement part 133 are engaged with each other such that the middle frame 20 is secured and mounted in the backplane 10. Specifically, in the assembly process, the connection member 233 inserts into the receiving slot 131 through the guiding slot 132. Because two connection arms are connected by the elastic member 232, when the connection member 233 pass through the communication portion of the guiding slot 132 and receiving slot 131, the two connection arms are compressed with each other. And after the connection member 233 enters into the receiving slot 131, the elastic member 232 will expand the two connection arm 231 out such that the connection member 233 and the engagement part 133 can engage with each other.

Furthermore, the backlight module includes a reflection plate 30, a light guide plate 40, and an optical film group 50 which are disposed sequentially on the bottom surface 11. The second end 21b of the horizontal portion 21 secures and compresses the optical film group 50.

Furthermore, the horizontal portion 21 is also used for carrying the liquid crystal panel 100. In this embodiment, the horizontal portion 21 also provides with a protrusion portion 24. The protrusion portion 24 is used for horizontally limiting a position of the liquid crystal panel 100.

As a preferred embodiment, in this embodiment, the first end 21a of the horizontal support portion 21 extends to and aligns with an outer side surface of the side wall 12 of the backplane 10. The hooks 23 connect at a bottom of the first end 21a of the horizontal support portion 21. After being assembled, an outer side surface of the hook 23 is aligned with or retracted inside the outer side surface of the side wall 12 (the outer side surface of the hook 23 does not exceed the outer side surface of the side wall 12).

As a preferred embodiment, in this embodiment, at the bottom surface 11 of the backplane 10, corresponding to each of the receiving slots 131, a notch 111 is respectively provided. The notch 111 communicates with the receiving slot 131. Through the notch 111, the hook 23 has a certain degree of freedom such that too long of the hook 23 so as to touch the bottom surface 11 of the backplane 10 can be avoided.

As a preferred embodiment, in this embodiment, the middle frame 20 is formed integrally by a plastic material.

In summary, the backlight module provided by the above embodiments, through disposing the engagement slot on the side wall of the backplane, and the hook which is cooperated to the engagement slot is connected at the vertical support portion of the middle frame. Because the hook is mounted in the engagement slot and engaged with each other, the middle frame and the backplane are secured. In the above embodiments, the vertical support portion of the middle frame only requires one support wall, and does not require covering the side wall of the backplane at outer side. The width of the frame of the liquid crystal display module could be effectively reduced, which is beneficial for a narrow frame design of the liquid crystal display module.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A backlight module comprising:
    a backplane including a bottom surface and a side wall, wherein, multiple engagement slots are disposed at the side wall, and each of the engagement slots has an engagement part; and a middle frame including a horizontal support portion having a first end; the first end is connected with multiple hooks; each of the hooks corresponds to one engagement slot; each of the hooks includes two connection arms; one end of each of the two connection arms connects with the first end of the horizontal support portion; the other end of each of the two connection arms is disposed with a connection member; the two connection arms are connected through an elastic member;

wherein, the hooks are mounted in the engagement slots; the connection members and the engagement parts are engaged with each other such that the middle frame is secured in the backplane.

2. The backlight module according to claim 1, wherein, each of the engagement slots includes a receiving slot and a guiding slot; the guiding slot is located at an upper portion of the side wall of the backplane; the receiving slot is located at a lower portion of the side wall of the backplane; the engagement part is located between the receiving slot and the guiding slot; the receiving slot and the guiding slot are communicated with each other.

3. The backlight module according to claim 2, wherein, at the bottom surface of the backplane, and corresponding to each of the receiving slots, a notch is respectively provided, and the notch is communicated with the receiving slot.

4. The backlight module according to claim 2, wherein, the guiding slot is an inverse-trapezoid structure; a width at a communication portion of the guiding slot and the receiving slot is smaller than a width of an upper portion of the guiding slot; the width at the communication portion of the guiding slot and the receiving slot is also smaller than a width of the receiving slot.

5. The backlight module according to claim 4, wherein, at the bottom surface of the backplane, and corresponding to each of the receiving slots, a notch is respectively provided, and the notch is communicated with the receiving slot.

6. The backlight module according to claim 1, wherein, the middle frame also includes a vertical support portion; one terminal of the vertical support portion is connected with the horizontal support portion, and the other terminal of the vertical support portion abuts against the bottom surface of the backplane.

7. The backlight module according to claim 1, wherein, the first end of the horizontal support portion extends to and aligns with an outer side surface of the side wall of the backplane; each of the hooks connects to a bottom of the first end of the horizontal support portion.

8. The backlight module according to claim 7, wherein, an outer side surface of the hook is aligned with or retracted inside the outer side surface of the side wall.

9. The backlight module according to claim 1, wherein, the backlight module further includes a reflection plate, a light guide plate, and an optical film group; a second end of the horizontal portion secures and compresses the optical film group.

10. The backlight module according to claim 1, wherein, the middle frame is formed integrally by a plastic material.

11. A liquid crystal display device including a liquid crystal panel and a backlight module; the liquid crystal panel and the backlight module are disposed oppositely; the backlight module provides a light source to the liquid crystal panel so that the liquid crystal panel can display an image, wherein, the backlight module comprises:

a backplane including a bottom surface and a side wall, wherein, multiple engagement slots are disposed at the side wall, and each of the engagement slots has an engagement part; and a middle frame including a horizontal support portion having a first end; the first end is connected with multiple hooks; each of the hooks corresponds to one engagement slot; each of the hooks includes two connection arms; one end of each of the two connection arms connects with the first end of the horizontal support portion; the other end of each of the two connection arms is disposed with a connection member; the two connection arms are connected through an elastic member;

wherein, the hooks are mounted in the engagement slots; the connection members and the engagement parts are engaged with each other such that the middle frame is secured in the backplane.

12. The liquid crystal display device according to claim 11, wherein, each of the engagement slots includes a receiving slot and a guiding slot; the guiding slot is located at an upper portion of the side wall of the backplane; the receiving slot is located at a lower portion of the side wall of the backplane; the engagement part is located between the receiving slot and the guiding slot; the receiving slot and the guiding slot are communicated with each other.

13. The liquid crystal display device according to claim 12, wherein, at the bottom surface of the backplane, and corresponding to each of the receiving slots, a notch is respectively provided, and the notch is communicated with the receiving slot.

14. The liquid crystal display device according to claim 12, wherein, the guiding slot is an inverse-trapezoid structure; a width at a communication portion of the guiding slot and the receiving slot is smaller than a width of an upper portion of the guiding slot; the width at the communication portion of the guiding slot and the receiving slot is also smaller than a width of the receiving slot.

15. The liquid crystal display device according to claim 14, wherein, at the bottom surface of the backplane, and corresponding to each of the receiving slots, a notch is respectively provided, and the notch is communicated with the receiving slot.

16. The liquid crystal display device according to claim 11, wherein, the middle frame also includes a vertical support portion; one terminal of the vertical support portion is connected with the horizontal support portion, and the other terminal of the vertical support portion abuts against the bottom surface of the backplane.

17. The liquid crystal display device according to claim 11, wherein, the first end of the horizontal support portion extends to and aligns with an outer side surface of the side wall of the backplane; each of the hooks connects to a bottom of the first end of the horizontal support portion.

18. The liquid crystal display device according to claim 17, wherein, an outer side surface of the hook is aligned with or retracted inside the outer side surface of the side wall.

19. The liquid crystal display device according to claim 11, wherein, the backlight module further includes a reflection plate, a light guide plate, and an optical film group; a second end of the horizontal portion secures and compresses the optical film group.

20. The liquid crystal display device according to claim 11, the middle frame is formed integrally by a plastic material.

* * * * *